UNITED STATES PATENT OFFICE.

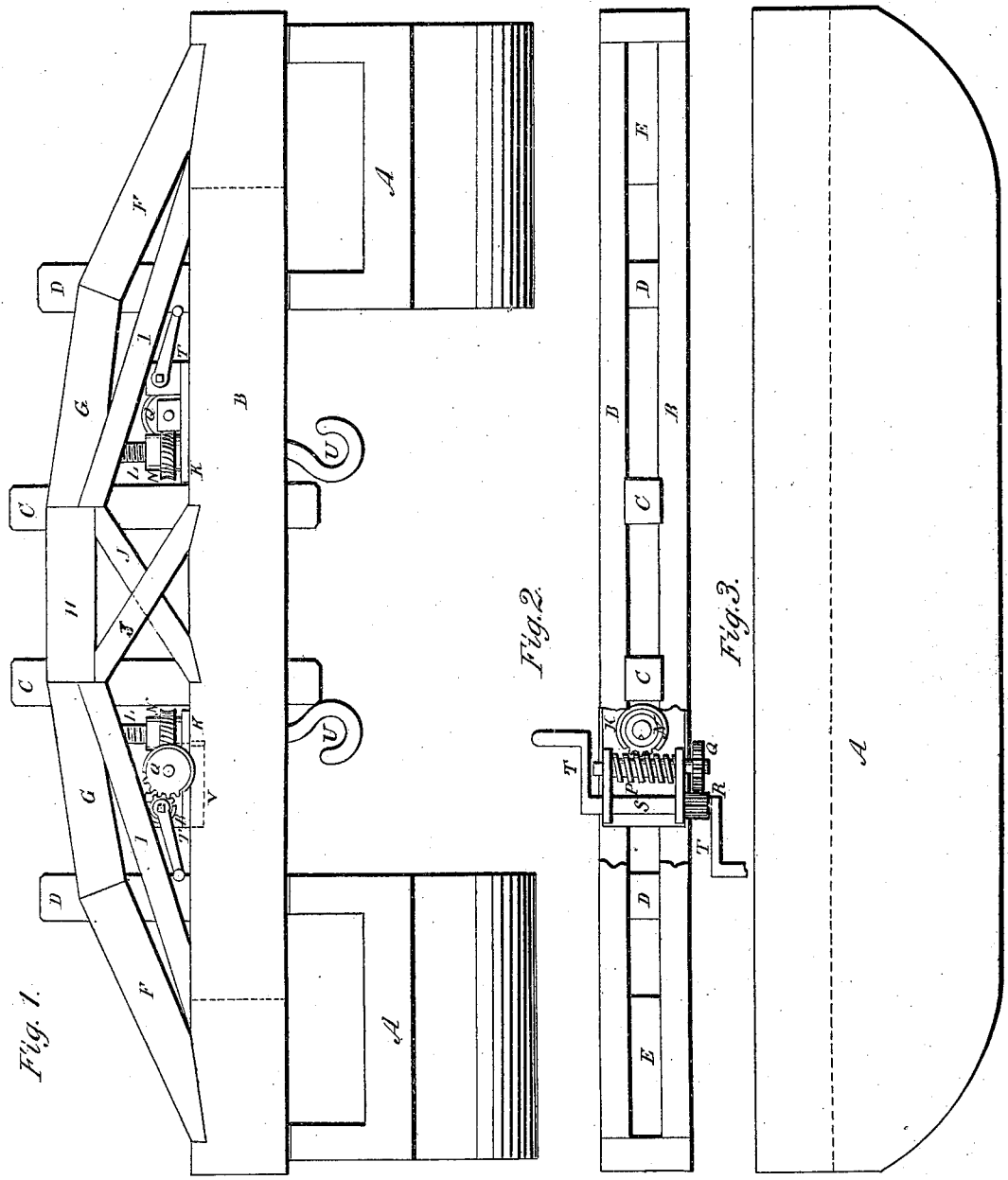

EDWARD TURNER, OF BALTIMORE, MARYLAND, ASSIGNOR TO THOMAS GRANNISS, OF SAME PLACE.

IMPROVEMENT IN APPARATUS FOR RAISING SUNKEN VESSELS.

Specification forming part of Letters Patent No. 41,875, dated March 8, 1864.

*To all whom it may concern:*

Be it known that I, EDWARD TURNER, of the city and county of Baltimore and State of Maryland, have invented certain new and useful Improvements in Apparatus for Raising Sunken Vessels, which I call a "Submarine Lifter or Floating Screw-Dock;" and I do hereby declare that the same is described and represented in the following specification and drawings.

To enable others skilled in the art to make and use my invention and improvements, I will proceed to describe their construction and operation, referring to the drawings, in which the same letters indicate like parts in each of the figures.

Figure 1 is an elevation of one of the trussed beams or frames with its ends resting on two boats. Fig. 2 is a top view of the truss frame or beam. Fig. 3 is a side elevation of one of the boats.

The nature of my invention and improvements in apparatus for raising sunken vessels, &c., consists in the use of lifting-screws provided with toothed or geared nuts working on trussed beams and turned by endless screws, substantially as hereinafter described, the said trussed beams being arranged across two or more lifting-vessels placed so far apart that the sunken vessel can be raised between them, and the beams made to extend so far onto the lifting-vessels as to prevent their careening, and thereby render all the buoyant power of the lifting-vessels available for raising the sunken vessel.

In the accompanying drawings, A A are two boats with the beam B resting upon them, as shown in Fig. 1. The struts or king-posts C C, the queen-posts D D, and the blocks E E are placed between the beams B B, as shown in the drawings, and the whole firmly fastened together by bolts or other strong fastenings. The first braces, F F, and second braces, G G, with the center beam, H, are all fitted together, as shown in the drawings, and fastened to the posts to truss the beams B B; and the frame is further strengthened by the under braces, I I, and cross-braces J J, so that the frame is very strong and the beams capable of supporting an immense weight.

I make some strong iron plates, K K, and place them on the beams, which plates are provided with holes for the lifting-screws L L, and the female screws or nuts N N turn on washers which lie on the plates K K. The peripheries of the nuts N are provided with teeth or worm-gear for the endless screws which turn the nuts. One of these screws is shown at P, Fig. 2, where the braces are broken away to show the lifting-fixtures. The journals of the screw P turn in stands fastened to the plate K, and the screw-shaft has the gear Q fastened to it, which is acted on by the pinion R on the shaft S, which turns in stands on the plate K, and is provided with cranks T T, by which it is turned to raise and lower the screws L L, which screws are provided with hooks U U for the chains which raise the sunken vessel.

To prevent the screws L from turning with the nuts, I make a groove in the screw and fasten a piece of iron onto the under side of the plate K, as shown by dotted lines at V, Fig. 1, which piece of iron is between the beams B, and has its end fitted to the groove in the screw, so that the screw will work up and down without turning.

I contemplate that the beams and frame may be strengthened by rods, straps, and bolts, as may be necessary, and that the main gear may be made separate from the nut and fitted loosely to it, and the gear made to rest on the washer under it, so that any little inclining of the screw or tipping of the nut while working will not tip the gear and make it bind the screw that turns it.

To raise a sunken vessel, two or more of these trussed beams are placed on the boats and the chains put under the sunken vessel are fastened to the hooks U U, when the cranks T T are turned so as to move the screws up and raise the sunken vessel; and when the screws have been moved up their whole length the chains may be connected to some chains put over the beams and the screws run down and hitched onto the chains again. In this way the chains and screws may be flected until the sunken vessel is raised up to the under side of the beams B B.

My improvements have the advantage over most of the apparatus for raising sunken vessels in keeping the lifting-vessels always on an even keel and preventing the lifting-vessels from being careened by the weight of the sunken vessel. Hence the whole buoyant power of the lifting-vessels is available, which would not be available if the lifting-vessels were careened.

I believe I have described and represented my invention and improvements in apparatus for raising sunken vessels so as to enable any person skilled in the art to make and use it without further invention or experiment.

I will now state what I desire to secure by Letters Patent, to wit:

What I claim as my invention is—

The combination of the lifting-screws, gearing, and chains, constructed and arranged as herein described, with two or more trussed beams, which beams rest on two or more floats or vessels, for the purpose of raising the sunken vessel, in the manner herein described.

EDWD. TURNER.

Witnesses:
J. DENNIS, Jr.,
DANL. ROWLAND.